United States Patent
Takiguchi et al.

(10) Patent No.: US 7,660,717 B2
(45) Date of Patent: Feb. 9, 2010

(54) SPEECH RECOGNITION SYSTEM AND PROGRAM THEREOF

(75) Inventors: Tetsuya Takiguchi, Yokohana (JP); Masafumi Nishimura, Yokohama (JP)

(73) Assignee: Nuance Communications, Inc., Burlington, MA (US)

( * ) Notice: Subject to any disclaimer, the term of this patent is extended or adjusted under 35 U.S.C. 154(b) by 107 days.

(21) Appl. No.: 11/971,651

(22) Filed: Jan. 9, 2008

(65) Prior Publication Data
US 2008/0183472 A1    Jul. 31, 2008

Related U.S. Application Data

(63) Continuation of application No. 10/389,859, filed on Mar. 14, 2003, now Pat. No. 7,403,896.

(30) Foreign Application Priority Data

Mar. 15, 2002  (JP)  ............................. 2002-072456

(51) Int. Cl.
  *G10L 15/14*    (2006.01)
  *G10L 15/00*    (2006.01)
  *G10L 15/06*    (2006.01)

(52) U.S. Cl. .................... 704/256.2; 704/233; 704/244; 704/255

(58) Field of Classification Search .................. None
See application file for complete search history.

(56) References Cited

U.S. PATENT DOCUMENTS

| 5,649,057 | A | 7/1997 | Lee et al. | |
|---|---|---|---|---|
| 5,721,808 | A * | 2/1998 | Minami et al. | 704/256.2 |
| 5,956,679 | A | 9/1999 | Komori et al. | |
| 6,076,057 | A | 6/2000 | Narayanan et al. | |
| 6,078,884 | A | 6/2000 | Downey | |
| 6,266,636 | B1 * | 7/2001 | Kosaka et al. | 704/244 |
| 6,418,411 | B1 | 7/2002 | Gong | |
| 6,772,117 | B1 | 8/2004 | Laurila et al. | |
| 6,950,796 | B2 | 9/2005 | Ma et al. | |
| 7,016,837 | B2 * | 3/2006 | Seo et al. | 704/233 |
| 7,120,580 | B2 * | 10/2006 | Rao Gadde et al. | 704/233 |

FOREIGN PATENT DOCUMENTS

| JP | 06-214592 | 8/1994 |
|---|---|---|
| JP | 10-011085 | 1/1998 |
| JP | 10-198394 | 7/1998 |
| JP | 2000-075889 | 3/2003 |
| JP | 2000-075890 | 3/2003 |

OTHER PUBLICATIONS

Nakamura, S. et al. "Noise and room acoustics distorted speech recognition by HMM composition," Acoustics, Speech and Signal Processing, vol. 1, pp. 69-72, 1996.*

* cited by examiner

*Primary Examiner*—Matthew J Sked
(74) *Attorney, Agent, or Firm*—Wolf, Greenfield & Sacks, P.C.

(57) ABSTRACT

Speech recognition is performed by matching between a characteristic quantity of an inputted speech and a composite HMM obtained by synthesizing a speech HMM (hidden Markov model) and a noise HMM for each speech frame of the inputted speech by use of the composite HMM.

3 Claims, 5 Drawing Sheets

| Clean HMMs | TECHNIQUE 1 | TECHNIQUE 2 |
|---|---|---|
| 61.2% | 78.4% | 90.2% |

FIG. 6

| Clean HMMs | TECHNIQUE 1 | TECHNIQUE 2 |
|---|---|---|
| 19.0% | 61.4% | 75.4% |

FIG. 7

SPEECH RECOGNITION SYSTEM AND PROGRAM THEREOF

CROSS-REFERENCE TO RELATED APPLICATIONS

This application is a continuation of U.S. patent application Ser. No. 10/389,859, filed Mar. 14, 2003.

FIELD OF INVENTION

The present invention relates to a speech recognition system, and more particularly, to recognizing a speech while coping with noise accompanied with a sudden change, such as noise generated suddenly or irregularly.

BACKGROUND OF THE INVENTION

One of the subjects in speech recognition processing for recognizing a Speech by means of a computer has been to perform highly precise recognition even under an environment where a variety of noise sources exist. Heretofore, as methods for performing the speech recognition under such a noise environment, various methods have been proposed, which include the spectral subtraction method, the HMM (hidden Markov model) composition method, the ODCN (codeword-dependent cepstral normalization) method, and the like.

In view of the fact that these methods have an aspect to recognize a speech, basically, the methods specify a part corresponding to noise from a speech signal in concerned speech after completion (or generation) of one utterance, and perform the speech recognition, considering (or removing) the specified noise part.

For example, the HMM composition method synthesizes various HMMs of noises and speechs together to generate phoneme hidden Markov models (composite HMMs) into which noise elements are incorporated, and performs the speech recognition based on a composite HMM highest in likelihood with respect to the speech to be recognized, thus coping with the noise. Such a conventional HMM composition method selects a composite HMM highest in likelihood for each speech and adopts the composite HMM as a recognition result. Specifically, one noise HMM comes to be selected for each utterance.

Incidentally, the way of noise generation is diversified by including noise that continues to be generated regularly, noise that is generated suddenly and noise that is generated irregularly under the environment where various noise sources exist. The above-described technology of coping with noise in the conventional speech recognition processing recognizes a type of the noise for each speech. Therefore, the technology exerts a sufficient effect for the noise that continues to be generated regularly and the noise that is generated regularly, and can realize good speech recognition.

However, the noise generated suddenly or the noise generated irregularly may possibly be generated during speech, and the conventional technology of recognizing the type of noise for each speech cannot cope with such noise that changes rapidly. This has been causing the precision of the speech recognition to be lowered.

SUMMARY OF THE INVENTION

In this connection, it is an aspect of the present invention to realize highly precise speech recognition that sufficiently copes even with noise accompanying a rapid change, such as the noise generated suddenly or the noise generated irregularly.

The present invention achieving the foregoing aspect is realized as a speech recognition apparatus performs the speech recognition by matching a predetermined speech to a phoneme hidden Markov model of speech data previously recorded. An example embodiment of a speech recognition apparatus comprises: a characteristic quantity extraction unit for extracting a characteristic quantity of an inputted speech to be recognized; a composite model generation unit for generating a composite model by synthesizing the phoneme hidden Markov model of the speech data previously recorded and a hidden Markov model of noise data previously recorded; and a speech recognition unit for recognizing the inputted speech by matching the characteristic quantity being extracted in the characteristic quantity extraction unit from the inputted speech, to the composite model generated in the composite model generation unit.

Another speech recognition apparatus according to the present invention is characterized by comprising: a speech database storing speech data as models for speech recognition; a noise database storing noise data assumed to be generated under a predetermined noise environment; a composite model generation unit for generating a composite model by synthesizing a speech model generated based on the speech data read out from the speech database and a noise model generated based on the noise data read out from the noise database; and a speech recognition unit for performing speech recognition by matching between a characteristic quantity of an inputted speech to be recognized and the composite model independently of each speech frame of the inputted speech.

Furthermore, another speech recognition apparatus of the present invention is characterized by comprising: a speech database storing speech data as models for speech recognition; a noise database storing noise data assumed to be generated under a predetermined noise environment; a composite model generation unit for generating a composite model by synthesizing a speech model generated based on the speech data read out from the speech database and a noise model generated based on the noise data read out from the noise database; and a speech recognition unit for performing speech recognition by matching between a characteristic quantity of an inputted speech to be recognized and the composite model generated in the composite model generation unit while dynamically selecting the composite model to be matched thereto in response to changes of noise incorporating the inputted speech.

Moreover, another aspect of the present invention achieving the foregoing aspect is realized as a speech recognition method as follows, which is for recognizing a speech by controlling a computer. This speech recognition method is characterized by comprising the steps of: extracting a characteristic quantity of an inputted speech to be recognized and storing the characteristic quantity in a memory; reading out from a memory a phoneme hidden Markov model into which noise elements are incorporated, the noise elements being generated based on noise data and predetermined speech; and recognizing the inputted speech by matching the characteristic quantity of the inputted speech to the phoneme hidden Markov model for each speech frame of the inputted speech, the recognition being performed based on results of the matching.

Furthermore, another speech recognition method according to the present invention is characterized by comprising the steps of: extracting a characteristic quantity of an inputted speech to be recognized and storing the characteristic quantity in a memory; reading out from a memory a phoneme hidden Markov model into which noise elements are incorporated, the noise elements being generated based on noise data and predetermined speech data; and recognizing the inputted speech by matching the characteristic quantity of the inputted speech to the phoneme-hidden Markov model while dynamically selecting the phoneme hidden Markov model to be matched thereto in response to changes of the noise incorporating the inputted speech.

BRIEF DESCRIPTION OF THE DRAWINGS

For a more complete understanding of the present invention and the advantages thereof, reference is now made to the following description taken in conjunction with the accompanying drawings.

FIG. 6 is a table comparing results of speech recognition (recognition rates) according to the example embodiment and a conventional technology.

FIG. 7 is a table comparing other results of speech recognition (recognition rates) according to the example embodiment the conventional technology.

DETAILED DESCRIPTION OF THE INVENTION

Figure 1:
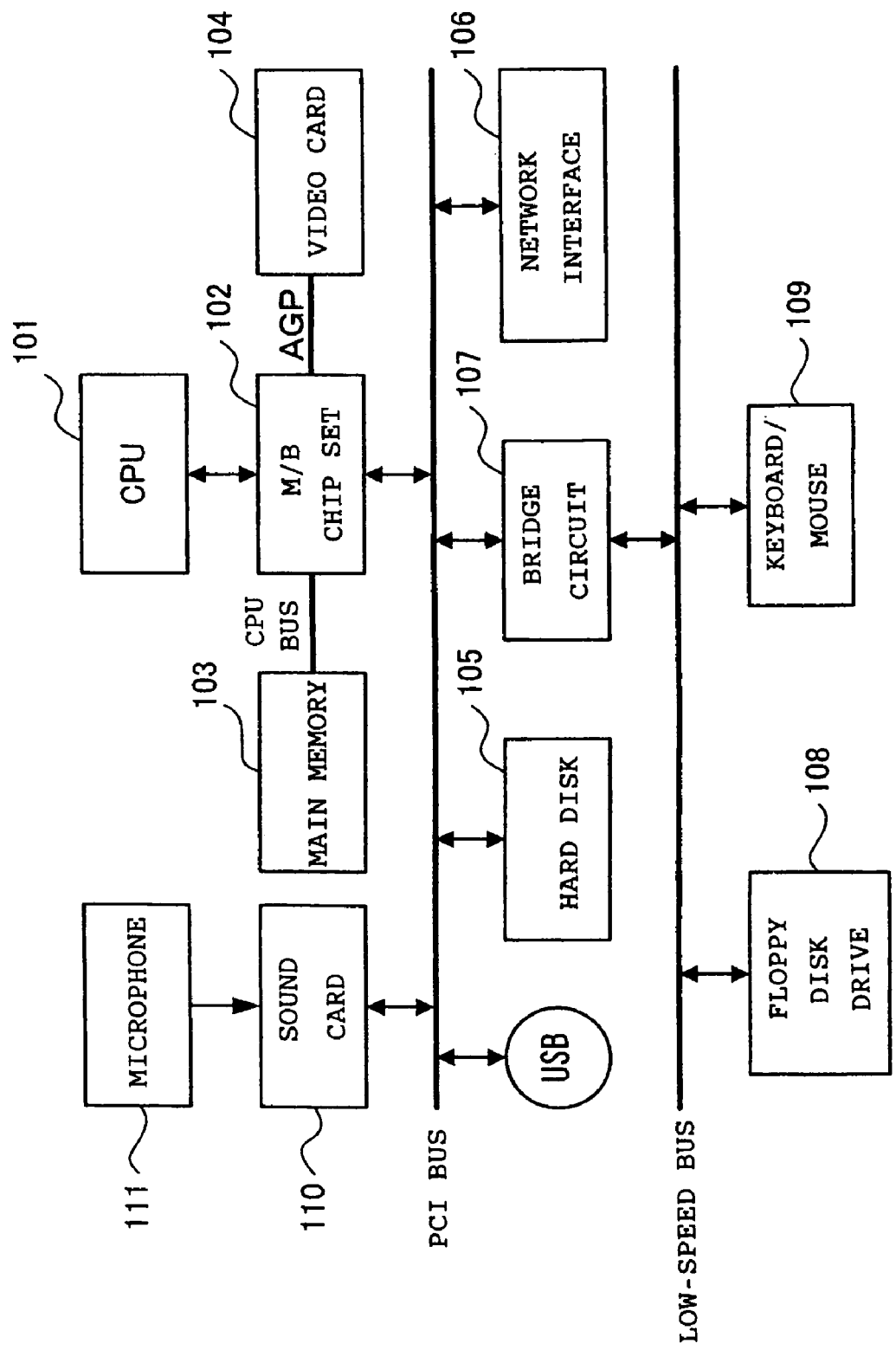
FIG. 1 is a diagram schematically showing an example of a hardware configuration of computer equipment suitable for realizing a speech recognition system according to an example embodiment of the present invention.

The present invention provides, methods, systems and apparatus to realize highly precise speech recognition that sufficiently copes with noise accompanying a rapid change, such as the noise generated suddenly or the noise generated irregularly. In an embodiment, this is realized as a speech recognition apparatus performs the speech recognition by matching a predetermined speech to a phoneme hidden Markov model of speech data previously recorded.

An example embodiment of a speech recognition apparatus comprises: a characteristic quantity extraction unit for extracting a characteristic quantity of an inputted speech to be recognized; a composite model generation unit for generating a composite model by synthesizing the phoneme hidden Markov model of the speech data previously recorded and a hidden Markov model of noise data previously recorded; and a speech recognition unit for recognizing the inputted speech by matching the characteristic quantity being extracted in the characteristic quantity extraction unit from the inputted speech, to the composite model generated in the composite model generation unit.

Here, the speech recognition apparatus is characterized in that this speech recognition unit selects the composite model to be matched to the characteristic quantity of the inputted speech independently of each of adequate segments defined by punctuating a speech sequence in the inputted speech, concretely, for example of each speech frame, and executes matching between the characteristic quantity of the inputted speech and the selected composite model.

Furthermore, in this speech recognition apparatus, the speech recognition unit is characterized by executing matching between the characteristic quantity and the composite model to be matched thereto while dynamically selecting the composite model to be matched thereto in response to changes of the noise incorporating the inputted speech in speech.

Moreover, another example of a speech recognition apparatus according to the present invention is characterized by comprising: a speech database storing speech data as models for speech recognition; a noise database storing noise data assumed to be generated under a predetermined noise environment; a composite model generation unit for generating a composite model by synthesizing a speech model generated based on the speech data read out from the speech database and a noise model generated based on the noise data read out from the noise database; and a speech recognition unit for performing speech recognition by matching between a characteristic quantity of an inputted speech to be recognized and the composite model independently of each speech frame of the inputted speech.

Furthermore, another example of a speech recognition apparatus of the present invention is comprised of: a speech database storing speech data as models for speech recognition; a noise database storing noise data assumed to be generated under a predetermined noise environment; a composite model generation unit for generating a composite model by synthesizing a speech model generated based on the speech data read out from the speech database and a noise model generated based on the noise data read out from the noise database; and a speech recognition unit for performing speech recognition by matching between a characteristic quantity of an inputted speech to be recognized and the composite model generated in the composite model generation unit while dynamically selecting the composite model to be matched thereto in response to changes of noise incorporating the inputted speech.

Moreover, another aspect of the present invention achieving the foregoing aspect is realized as a speech recognition method as follows, which is for recognizing a speech by controlling a computer. This speech recognition method comprises the steps of: extracting a characteristic quantity of an inputted speech to be recognized and storing the characteristic quantity in a memory; reading out from a memory a phoneme hidden Markov model into which noise elements are incorporated, the noise elements being generated based on noise data and predetermined speech; and recognizing the inputted speech by matching the characteristic quantity of the inputted speech to the phoneme hidden Markov model for each speech frame of the inputted speech, the recognition being performed based on results of the matching.

Furthermore, another example of a speech recognition method according to the present invention comprises the steps of: extracting a characteristic quantity of an inputted speech to be recognized and storing the characteristic quantity in a memory; reading out from a memory a phoneme hidden Markov model into which noise elements are incorporated, the noise elements being generated based on noise data and predetermined speech data; and recognizing the inputted speech by matching the characteristic quantity of the inputted speech to the phoneme hidden Markov model while dynamically selecting the phoneme hidden Markov model to be matched thereto in response to changes of the noise incorporating the inputted speech.

Moreover, the present invention is realized as a program for controlling a computer to realize the foregoing speech recognition apparatus or as a program for making the computer execute processing corresponding to each step of the foregoing speech recognition method. This program is provided in such a manner that the program is stored in a recording medium such as a magnetic disk, an optical disk and a semiconductor memory and distributed or in a manner that the program is delivered through a network.

The present invention will be described below in detail based on an example embodiment shown in the accompanying drawings. FIG. 1 is a diagram schematically showing an example of a hardware configuration of computer equipment suitable for realizing a speech recognition system according to this embodiment.

The computer equipment 1 shown in FIG. 1 includes: a CPU (central processing unit) 101 as computing means; a main memory 103 connected to the CPU 101 through the M/B (motherboard) chip set 102 and the CPU bus; a video card 104 connected to the CPU 101 through the same M/B chip set 102 and the AGP (accelerated graphics port); a hard disk 105 and the network interface 106 which are connected to the M/B chip set 102 through the PCI (peripheral component interconnect) bus; and a floppy disk drive 108 and a keyboard/mouse 109 which are connected to a M/B chip set 102 through this PCI bus, the bridge circuit 107 and a low-speed bus such as an ISA (industry standard architecture) bus. Moreover, the computer equipment includes a sound card (sound chip) 110 and a microphone 111 which are provided for receiving speech to be processed, converting the speech into speech data, and supplying the CPU 101 with the speech data.

Note that FIG. 1 only exemplifies the hardware configuration of the computer equipment that materializes this embodiment, and other various configurations can be adopted as long as this embodiment can be applied thereto. For example, a configuration may be adopted, in which only a video memory is mounted in place of providing the video card 104 and image data is processed by means of the CPU 101. Alternatively, a drive for a CD-ROM (compact disc read only memory) or a DVD (digital versatile disc read only memory) may be provided through an interface such as an ATA (AT attachment).

Figure 2:
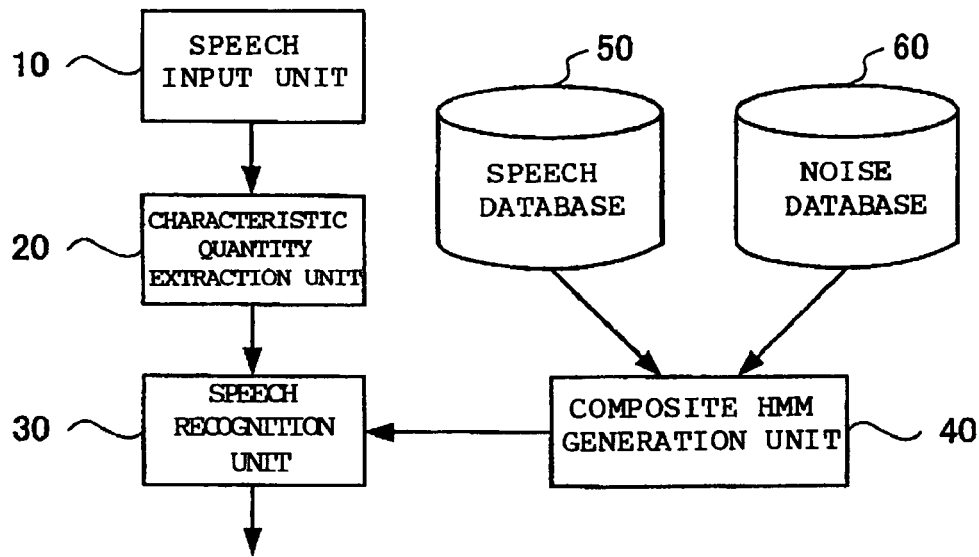
FIG. 2 is a diagram showing a configuration of a speech recognition system according to the example embodiment, which is realized by computer equipment shown in FIG. 1.

FIG. 2 is a diagram showing a configuration of a speech recognition system according to this embodiment, which is realized by the computer equipment shown in FIG. 1. This example embodiment realizes a speech recognition system for performing highly precise speech recognition, which copes with noise generated suddenly or regularly by use of the HMM (hidden Markov model) composition method under an environment where the types of generated noise are limited to some extent, as in a vehicle cabin.

As shown in FIG. 2, the speech recognition system according 8 to this embodiment includes the speech input unit 10, the characteristic quantity extraction unit 20, the speech recognition unit 30, and the composite HMM generation unit 40 for generating a composite HMM for use in the speech recognition unit 30. Moreover, the speech recognition system includes speech database 50 and the noise database 60 which are for use in generating a composite HMM in the composite HMM generation unit 40.

In the foregoing configuration, the characteristic quantity extraction unit 20, the speech recognition unit 30 and the composite HMM generation unit 40 are a virtual software block realized by controlling the CPU 101 by means of a program unfolded in the main memory 103 shown in FIG. 1. The concerned program for controlling the CPU 101 to realize the functions of these units is provided in such a manner that the program is stored in a recording medium such as a magnetic disk, an optical disk and a semiconductor memory and distributed or in a manner that the program is delivered through a network. In this embodiment, the speech recognition system receives the program through the network interface 106 and the floppy disk drive 108 which are shown in FIG. 1, an un-illustrated CD-ROM drive or the like, and stores the program in the hard disk 105. Then, the system reads into the main memory 103 the program stored in the hard disk 105 and unfolds the program there, and then executes the program in the CPU 101, thus realizing the functions of the respective constituent elements shown in FIG. 2.

Moreover, the speech input unit 10 is realized by the microphone 111 and the sound card 110. The speech database 50 and the noise database 60 are realized by, for example, the hard disk 105.

In this embodiment, the speech input unit 10 is realized by the microphone 111 and the sound card 110. The speech input unit 10 receives speech, converts the speech into an electrical speech signal, and delivers the signal to the characteristic quantity extraction unit 20.

The characteristic quantity extraction unit 20 processes the speech signal inputted from the speech input unit 10 to extract a characteristic quantity. The extracted characteristic quantity is stored in a predetermined area of a cache memories of the main memory 103 and the CPU 101. In the HMM for the speech recognition, a cepstrum coefficient is widely used as an acoustic parameter, and the characteristic quantity extraction unit 20 can perform cepstrum analysis as extraction processing for the characteristic quantity.

The speech recognition unit 30 performs matching between the characteristic quantity of the inputted speech signal, which has been extracted in the characteristic quantity extraction unit 20, and a predetermined speech model (HMM). Then, the speech recognition unit 30 outputs characters (texts) obtained as a result of the matching (recognition result). In this embodiment, the composite HMM generated in the composite HMM generation unit 40 to be described later is used. Thus, the above-described matching is performed while adapting an acoustic model (phoneme model, word model and so on) for use in the speech recognition processing by the speech recognition unit 30 to the environment where noise is generated suddenly or irregularly. The matching using the composite HMM will be described later. The composite HMM generation unit 40 accesses the speech database 50 and the noise database 60 and generates the composite HMM.

Figure 3:
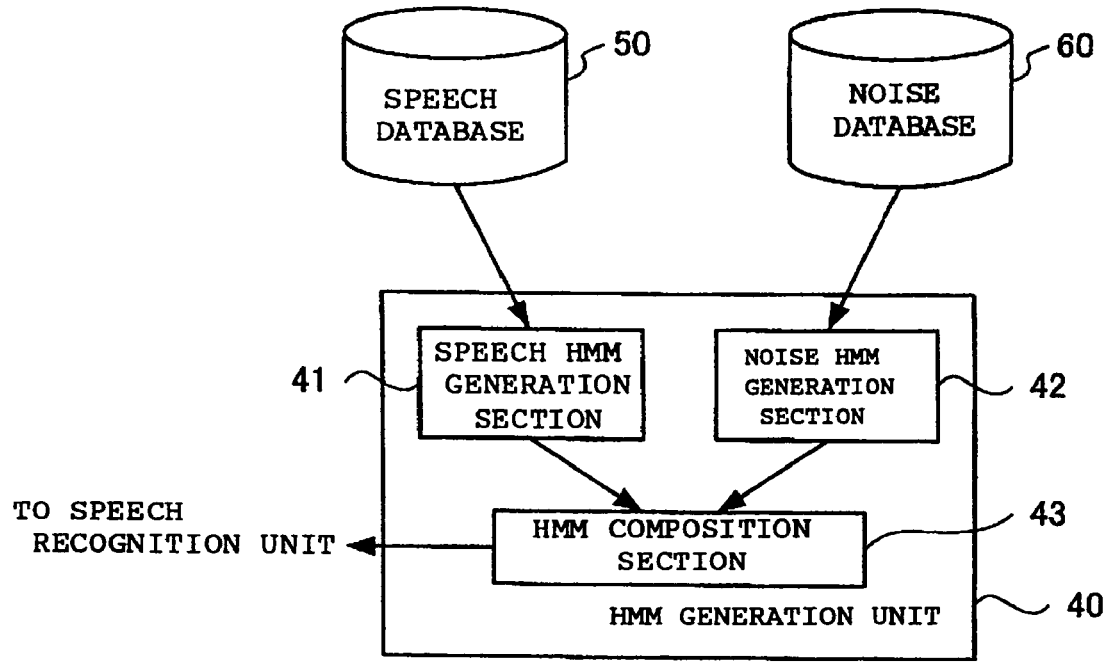
FIG. 3 is a diagram showing a function of a composite HMM generation unit in the example embodiment.

FIG. 3 is a functional block diagram explaining the function of the composite HMM generation unit 40. Referring to FIG. 3, the composite HMM generation unit 40 includes: the speech HMM generation section 41 for generating a speech model (speech HMM) by accessing the speech database 50; the noise HMM generation section 42 for generating a noise model (noise HMM) recorded previously by accessing the noise database 60; and the HMM composition section 43 for generating a phoneme hidden Markov model (composite HMM) into which noise elements are incorporated by synthesizing the generated speech HMM and noise HMM.

Speech data recorded in an environment without noise is registered in the speech database 50, and the speech HMM generation section 41 generates the speech HMM by use of this speech data. The generated speech HMM is kept in the predetermined area of the cache memories of the main memory 103 and the CPU 101.

Noise data assumed in a use environment of the speech recognition system in this embodiment is registered in the noise database 60, and the noise HMM generation section 42 generates the noise HMM independently of each noise source by use of this noise data. The generated noise HMM is kept in the predetermined area of the cache memories of the main memory 103 and the CPU 101.

Here, the noise database 60 will be further described. Various noise factors exist under the actual environment, and therefore, a data quantity becomes enormous if the noise HMMs are going to be generated by recording the noise data for the entire factors. However, types of noises generated frequently are sometimes limited to some extent depending on the environment where the speech recognition system is used. For example, in the case of a speech recognition system mounted as receiving means of a car navigation system, assumed as noises generated frequently in a vehicle cabin are: a sound generated by stepping on a manhole, a sound of a direction indicator and a wiper operation sound as irregular noises, besides relatively regular running noise (engine sound and road noise). In this connection, the noise database 60 is previously generated for the noise assumed to be generated frequently in response to the environment where the speech recognition system is used, thus making it possible to realize a practical speech recognition system in which the data quantity does not become enormous. Note that, needless to say, the size of the noise database 60 can be changed flexibly since the quantity of processable noise data is changed in response to the throughput or the like of the hardware (CPU 101 and so on).

The HMM composition section 43 acquires the speech HMM generated in the speech HMM generation section 41 and the speech HMM generated in the noise HMM generation section 42 from the main memory 103 and the like, and synthesizes these HMMs to generate a composite HMM.

Figure 4:
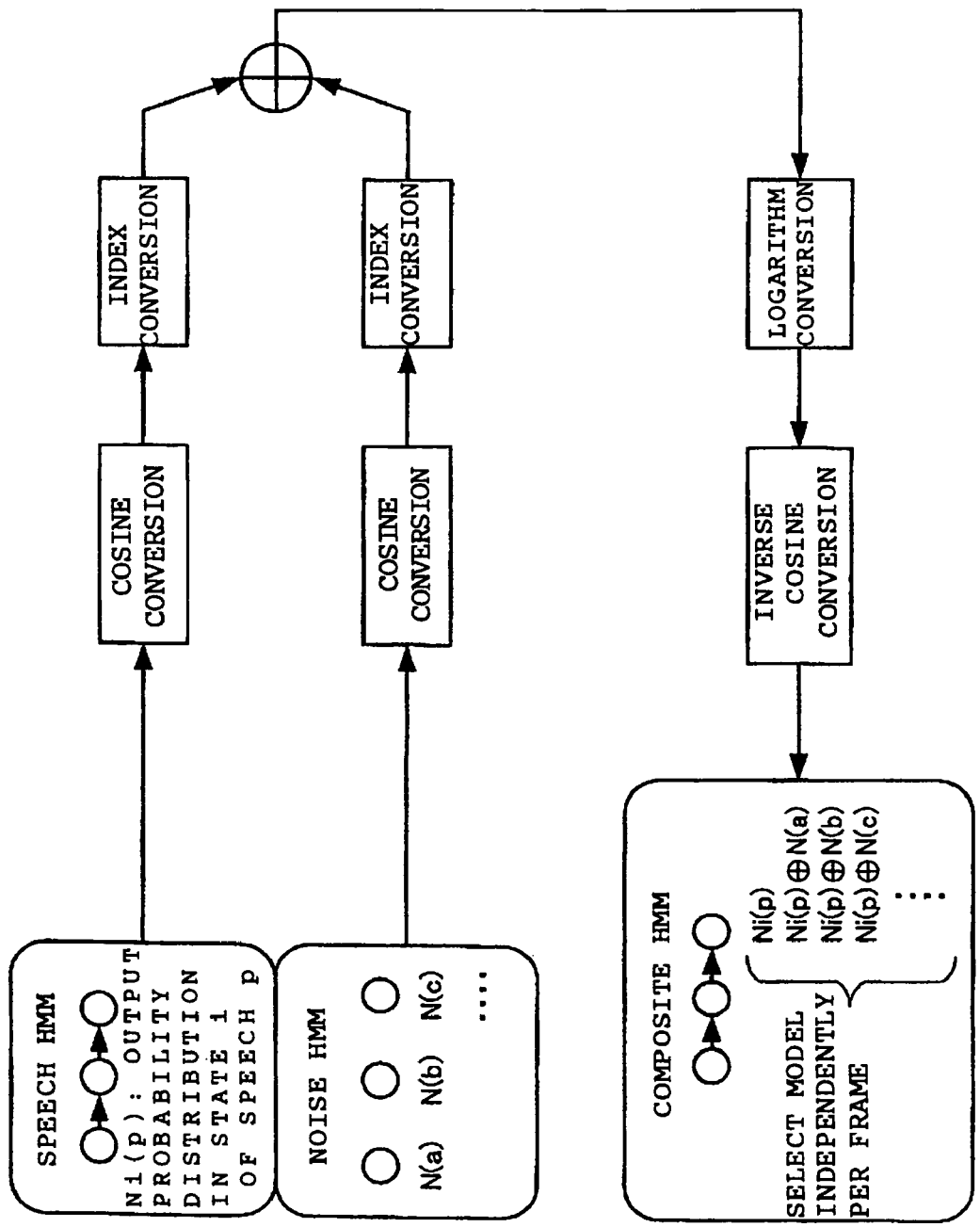
FIG. 4 is a diagram showing an operation of a HMM composition section in the example embodiment.

FIG. 4 is a diagram explaining the operation of the HMM composition section 43. In FIG. 4, the output probability distribution in the i-th state among three states of the HMMs constituting a predetermined speech /p/ is represented as $N_i(p)$, and the output probability distributions of the respective noise models are represented as $N(a), N(b), N(c)$ . . . .

Here, it is assumed that the output probability distributions in these HMMs are generated in a cepstral region. In this case, the HMM composition section 43 performs cosine conversion and then exponential conversion for the speech HMM and the noise HMMs individually to convert the HMMs into spectral areas. Then, the HMM composition section 43 performs folding (composition) of the distributions.

Next, the HMM composition section 43 performs logarithm conversion and then inverse cosine conversion for the synthesized distribution to convert the distribution to the cepstral region, thus obtaining the composite HMMs. The distribution composition is performed for the output probability distributions of the noise HMMs prepared independently of each noise source. Therefore, the composite HMMs will also be defined independently of each noise source. The obtained composite HMMs are kept in the predetermined area of the cache memories of the main memory 103 and the CPU 101.

The above distribution conversion is described in detail in, for example, the following document.

Document: T. Takiguchi et al., "HMM-Separation-Based speech Recognition for a Distant Moving Speaker," IEEE Transactions on speech and audio processing, Vol. 9, No. 2, pp. 127-140, 2001.

The speech recognition unit 30 matches the characteristic quantity of the inputted speech signal, which has been extracted in the characteristic quantity extraction unit 20, to each of the composite HMMs generated by the composite HMM generation unit 40 in such a manner as described above, thus recognizing this inputted speech signal. Note that, while it is necessary to perform linguistic analysis besides the acoustic analysis performed in this embodiment in order to complete the speech recognition processing, this linguistic analysis is out of the technical aspect of this embodiment and a publicly known technology can be used therefor.

Here, the speech recognition unit 30 in this embodiment performs the matching (likelihood calculation) between the characteristic quantity of the inputted speech signal and the composite HMM independently per speech frame in the inputted speech signal. The speech frame is a minimum unit of a time axis in speech data.

Figure 5:
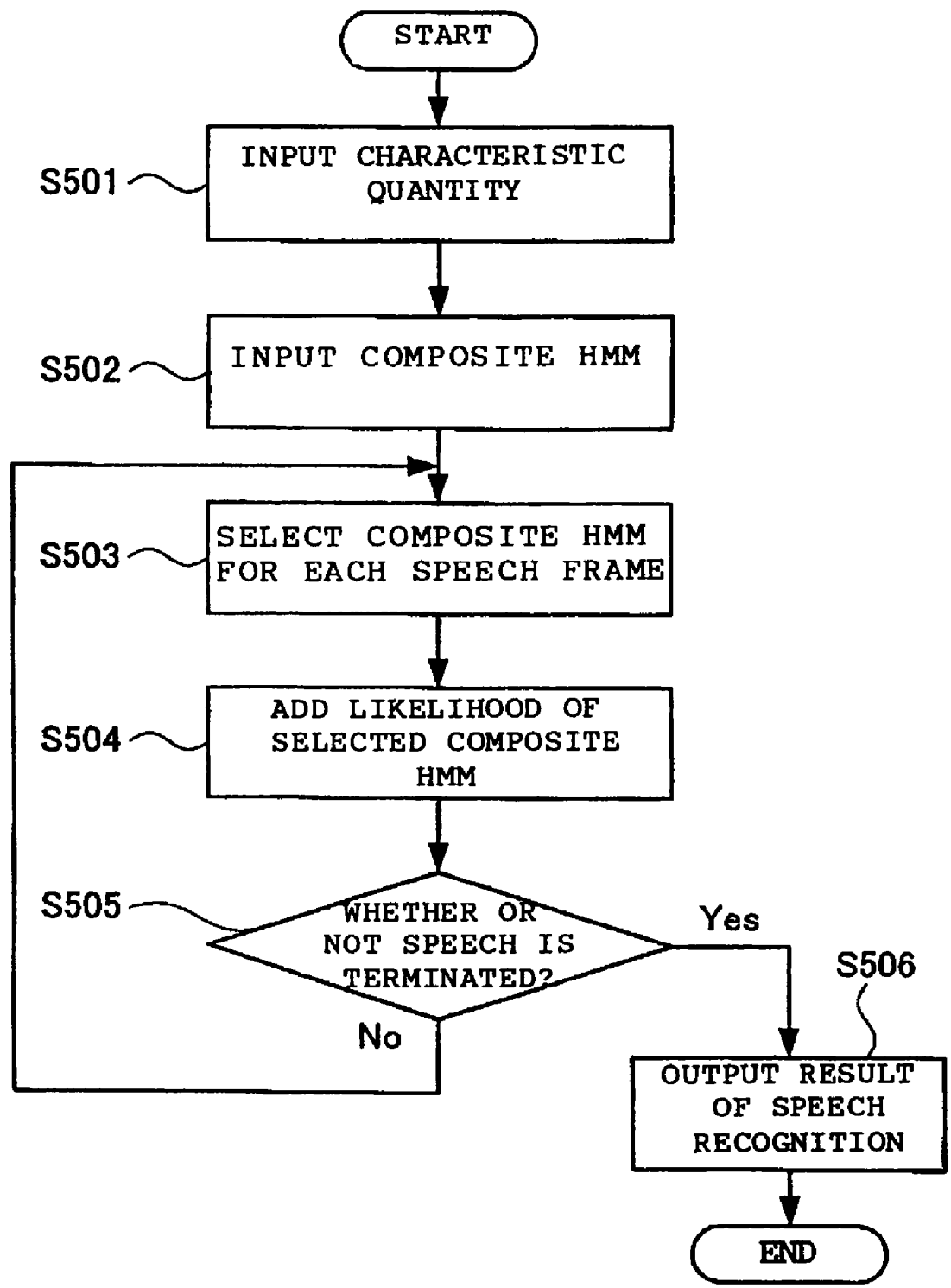
FIG. 5 is a flowchart showing speech recognition processing of a speech recognition unit according to the example embodiment.

FIG. 5 is a flowchart explaining the speech recognition processing of the speech recognition unit 30 according to this embodiment. As shown in FIG. 5, the speech recognition unit 30 acquires the characteristic quantity of the inputted speech signal, which has been extracted in the characteristic quantity extraction unit 20, and the above-described composite HMMs from the main memory 103 and the like (Steps 501 and 502). Then, the speech recognition unit 30 selects a composite HMM in which the likelihood with the characteristic quantity of the inputted speech signal becomes the maximum (Step 503), and employs the value thereof as a likelihood at that time (speech frame). The employed likelihood is temporarily kept in the cache memories of the main memory 103 and the CPU 101.

Then, the speech recognition unit 30 adds up the maximum likelihood at each time (speech frame) until the end of the speech while selecting the composite HMM in which the likelihood increases to the maximum for each speech frame (Step 504). Specifically, if the maximum likelihood is obtained for the speech frame, then the speech recognition unit 30 reads out and adds up the likelihood kept in the main memory 103 and the like, and stores the added likelihood again in the main memory 103 and the like. In such a manner, the likelihood of the composite HMM selected in Step 503 comes to be added sequentially to the sum of the maximum likelihoods till the speech frame immediately before. The likelihood for the entire speech is calculated by repeating this processing until the end of the speech (Step 505). After the processing for adding the likelihoods until the end of the speech is performed, the speech recognition unit 30 performs the speech recognition by use of the calculated likelihood for the entire speech and outputs a result thereof (Steps 505 and 506).

In such a manner as described above, the matching of the characteristic quantity to the composite HMM into which the noise is incorporated is performed independently per speech frame in the recognition processing for one utterance. Thus, even in the case where the state or type of the noise changes in one utterance due to the sudden generation of the noise, it is made possible to cope with such a change by dynamically changing the noise model applied to the matching. Determination can be made as to which part of a predetermined inputted signal is speech by use of the existing method.

The following should be noted. The composite HMM (of the maximum likelihood) has been searched, which is matched to the characteristic quantity per speech frame, in the above-described operation of this embodiment. However, the same noise HMM is allocated for each of adequate segments defined by punctuating a speech sequence, for example, for each certain time, for each state of the speech HMMs, and for each speech HMM, thus also making it possible to reduce the search time for the composite HMM in the matching and to reduce the processing cost. Although the processing capability for the irregular noise is lowered as compared with the case where the matching is performed for each speech frame in this case, an adequate interval is set in response to the noise environment where the speech recognition system is used (including the assumed type of the noise and the like), and thus the method described here can be applied without lowering the precision of the speech recognition.

Next, a concrete evaluation experiment using this embodiment will be described. Recognition rates were measured and compared among recognition using a speech model that does not consider noise (Clean HMMs), recognition according to the conventional HMM composition method (technique 1) and the recognition according to this embodiment (technique 2), using the speech recognition system according to the present invention for the speech recognition in a vehicle cabin. Moreover, effectiveness of the technique according to this embodiment verified for three types of noises, which are a hazard (direction indicator) sound as the sudden noise, the wiper operation sound as the irregular noise having some time length, and engine noise during idling as the regular noise.

<Evaluation 1>

Here, the following two types of noises are incorporated into speech data to be evaluated, the types being:
  engine noise during idling (hereinafter, referred to as idling noise); and
  hazard (direction indicator) sound.

Here, the hazard sound has a cycle of approximately 0.4 sec.

Noise HMMs previously prepared during the recognition are the following six types, which are: 1. idling noise; 2. running noise (road noise when running on a local street at approximately 40 to 50 Km/h); 3. hazard sound; 4. wiper operation sound; 5. hazard sound+idling noise; and 6. wiper sound+ running noise. Moreover, it is assumed that one noise HMM is represented by one state and one multidimensional normal distribution.

Next, these noise HMMs and speech HMMs (55 pieces of phoneme HMMs) are synthesized. In the speech HMMs, each phoneme has four multidimensional normal distributions for each phoneme. The speech HMMs are synthesized with the noise HMMs for each state of these distributions.

Analysis conditions for the signals are: 12 kHz for the sampling frequency; 32 msec. for the frame width; and 8 msec. for the analysis cycle. As an acoustic characteristic quantity the MFCC (Mel Frequency Cepstral Coefficient) 16 dimension was used. Moreover, the test speaker was one male, and the recognition was made for 500 words.

FIG. 6 is a table showing results of the speech recognition rates) according to the three types of techniques performed under the above-described conditions. Referring to FIG. 6, it is found out that the recognition rate of the technique 2 (this embodiment) coping with not only the idling noise but also the sudden hazard sound is greatly improved as compared with the technique 1 (conventional HMM composition method) that cannot cope with anything but the regular idling noise.

<Evaluation 2>

Here, the following two types of noises are incorporated into speech data to be evaluated, the types being:
  running noise (during running on a local street); and
  wiper operation sound.

Here, the wiper operation sound has a cycle of approximately 1.1 sec. Other conditions are the same as those in the <Evaluation 1>.

FIG. 7 is a table showing results of the speech recognition (recognition rates) according to the three types of techniques performed under the above-described conditions. Referring to FIG. 7, it is found out that the technique 2 (this embodiment) that dynamically switches the noise models to be applied in a speech sequence acquires higher recognition precision than the technique 2 (conventional HMM composition method) since there are both segments where the wiper operation sounds are generated and are not generated in one utterance under the above-described conditions.

As described above, according to the present invention, it is possible to realize the highly precise speech recognition which sufficiently copes with the noise accompanied with the rapid change, such as the noise generated suddenly or irregularly.

Although the preferred embodiment of the present invention has been described in detail, it should be understood that various changes, substitutions and alternations can be made therein without departing from spirit and scope of the inventions as defined by the appended claims.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention.

This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

The invention claimed is:

1. A speech recognition apparatus comprising:
   a characteristic quantity extraction unit for extracting a characteristic quantity of an inputted speech to be recognized, wherein said apparatus performs speech recognition by matching between a predetermined speech and a phoneme hidden Markov model of speech data previously recorded;
   a composite model generation unit for generating a composite model by synthesizing the phoneme hidden Markov model of speech data and a hidden Markov model of noise data previously recorded; and
   a speech recognition unit for recognizing the inputted speech by matching the characteristic quantity being extracted in the characteristic quantity extraction unit from the inputted speech, to the composite model generated in the composite model generation unit, wherein the speech recognition unit executes matching between the characteristic quantity of the inputted speech and the composite model for each of adequate segments defined by punctuating a speech sequence in the inputted speech, and
   wherein the speech recognition unit selects the composite model to be matched to the characteristic quantity of the inputted speech independently of each speech frame thereof and executes matching between the characteristic quantity of the inputted speech and the composite model.

2. A speech recognition apparatus comprising:
   a speech database storing speech data as models for speech recognition;
   a noise database storing noise data assumed to generate under a predetermined noise environment;
   a composite model generation unit for generating a composite model by synthesizing a speech model generated based on the speech data read out from the speech database and a noise model generated based on the noise data read out from the noise database; and
   a speech recognition unit for performing speech recognition by matching between a characteristic quantity of an inputted speech to be recognized and the composite model generated in the composite model generation unit independently of each speech frame of the inputted speech.

3. A computer program product comprising a tangible storage medium readable by a processing circuit and storing computer-readable instructions for execution by the processing circuit for performing a method of speech recognition, the method comprising steps of:
   extracting a characteristic quantity of an inputted speech to be recognized;
   generating a composite model including synthesizing a phoneme hidden Markov model of speech data previously recorded and a hidden Markov model of noise data previously recorded;
   recognizing the inputted speech including matching between the characteristic quantity of the inputted speech and the composite model for each of adequate segments defined by punctuating a speech sequence in the inputted speech; and
   selecting the composite model to be matched to the characteristic quantity of the inputted speech independently of each speech frame thereof and executes matching between the characteristic quantity of the inputted speech and the composite model.

* * * * *